(12) United States Patent
Klotzbuecher et al.

(10) Patent No.: US 7,962,269 B2
(45) Date of Patent: Jun. 14, 2011

(54) METHOD AND ARRANGEMENT FOR DETECTING THE ACTUATION OF AN OPERATOR-CONTROLLED ELEMENT

(75) Inventors: Thomas Klotzbuecher, Rudersberg (DE); Bernhard Bauer, Weissach (DE); Harald Kazmierczak, Beilstein (DE); Sebastien Weiss, Fellbach (DE)

(73) Assignee: Robert Bosch GmbH, Stuttgart (DE)

( * ) Notice: Subject to any disclaimer, the term of this patent is extended or adjusted under 35 U.S.C. 154(b) by 1283 days.

(21) Appl. No.: 10/786,043

(22) Filed: Feb. 26, 2004

(65) Prior Publication Data

US 2004/0167699 A1 Aug. 26, 2004

(30) Foreign Application Priority Data

Feb. 26, 2003 (DE) .................. 103 08 497

(51) Int. Cl.
*G06F 7/70* (2006.01)
*G06G 7/00* (2006.01)
*G06G 7/76* (2006.01)

(52) U.S. Cl. .............. 701/70; 701/34; 701/45

(58) Field of Classification Search .............. 701/70, 701/34, 45; 123/399, 361, 406.74; 73/1.75, 73/379.07; 74/513, 512, 560, 514, 482, 539, 74/542; 180/65.1–65.8, 170, 174, 179
See application file for complete search history.

(56) References Cited

U.S. PATENT DOCUMENTS

| | | | | |
|---|---|---|---|---|
| 3,151,499 A * | 10/1964 | Roe | ................. | 74/560 |
| 3,448,634 A * | 6/1969 | Eggers et al. | .................. | 74/560 |
| 4,454,497 A * | 6/1984 | Morse | ........................ | 340/438 |
| 4,541,387 A * | 9/1985 | Morikawa | .................... | 123/481 |
| 4,615,321 A * | 10/1986 | Haefner et al. | ................ | 123/479 |
| 4,722,411 A * | 2/1988 | Ohashi et al. | .................. | 180/197 |
| 5,009,279 A * | 4/1991 | Matsuda | ........................ | 180/197 |
| 5,099,816 A * | 3/1992 | Ohga et al. | ..................... | 123/481 |
| 5,113,823 A * | 5/1992 | Iriyama | .......................... | 123/399 |
| 5,128,869 A * | 7/1992 | Akishino et al. | ................ | 701/97 |
| 5,150,635 A * | 9/1992 | Minowa et al. | ................. | 477/43 |
| 5,431,139 A * | 7/1995 | Grutter et al. | ................. | 123/198 F |
| 5,507,201 A * | 4/1996 | Fairbairn et al. | ................ | 74/513 |
| 5,529,296 A * | 6/1996 | Kato et al. | ..................... | 267/155 |
| 5,713,428 A * | 2/1998 | Linden et al. | .................. | 180/179 |
| 5,774,820 A * | 6/1998 | Linden et al. | .................... | 701/93 |
| 5,868,040 A * | 2/1999 | Papenhagen et al. | ........... | 74/513 |
| 5,878,359 A * | 3/1999 | Takeda | ............................ | 701/34 |
| 5,934,152 A * | 8/1999 | Aschoff et al. | ................. | 74/513 |
| 5,992,384 A * | 11/1999 | Bauer et al. | .................... | 123/399 |
| 6,293,249 B1 * | 9/2001 | Kuretake | ........................ | 123/399 |
| 6,719,076 B1 * | 4/2004 | Tabata et al. | .................. | 180/65.7 |
| 6,805,022 B1 * | 10/2004 | Steindl et al. | ................... | 74/513 |
| 2002/0002873 A1 * | 1/2002 | Yaddehige | ....................... | 74/512 |
| 2002/0139348 A1 * | 10/2002 | Kuretake | ...................... | 123/399 |
| 2002/0152831 A1 * | 10/2002 | Sakamoto et al. | .............. | 74/512 |

(Continued)

*Primary Examiner* — Khoi Tran
*Assistant Examiner* — Jorge O Peche
(74) *Attorney, Agent, or Firm* — Walter Ottesen

(57) ABSTRACT

A method and an arrangement (15) for detecting the actuation of an operator-controlled element (1) make possible a reliable detection of an operator-controlled function to be activated by the operator-controlled element (1) independently of environmental and wear conditions. The operator-controlled element (1) can be actuated with different adjustable degrees of actuation. Various operator-controlled functions of the operator-controlled element (1) are realized in dependence upon the degree of actuation. The operator-controlled element (1) is actuated against a spring force and at least two degrees of actuation are characterized by different spring constants. The at least one of the operator-controlled functions of the operator-controlled element (1) is detected in dependence upon the spring constant assigned to the instantaneous degree of actuation.

10 Claims, 1 Drawing Sheet

U.S. PATENT DOCUMENTS

| | | | |
|---|---|---|---|
| 2003/0019278 A1* | 1/2003 | Kato et al. | 73/1.75 |
| 2004/0259687 A1* | 12/2004 | Ritter et al. | 477/187 |
| 2005/0148429 A1* | 7/2005 | Imai et al. | 477/179 |
| 2006/0106512 A1* | 5/2006 | Funcke et al. | 701/34 |

* cited by examiner

METHOD AND ARRANGEMENT FOR DETECTING THE ACTUATION OF AN OPERATOR-CONTROLLED ELEMENT

CROSS REFERENCE TO RELATED APPLICATION

This application claims priority of German patent application no. 103 08 497.5, filed Feb. 26, 2003, the entire content of which is incorporated herein by reference.

BACKGROUND OF THE INVENTION

In motor vehicles having an automatic transmission, it is known that a kick-down function is needed in order to signalize a maximum acceleration command of the driver to the motor control. In vehicles having a speed limiting function, it is known to use an escape switch which, for dangerous situations, makes possible a rapid disablement of the speed limiting function and therefore makes possible reaching the maximum vehicle speed or vehicle acceleration. The kick-down function as well as the escape switch can be realized with the aid of the accelerator pedal in that the accelerator pedal is pressed through up to a stop. Accelerator pedals, which have no mechanical connection to the throttle flap or to an actuating element for adjusting the metering of fuel (for example, to an injection valve), the kick-down function or the function of the escape switch can be electrically inquired of when a linear transducer or an angle transducer is arranged on the accelerator pedal in order to detect the degree of actuation of the accelerator pedal. The linear transducer or angle transducer can, for example, make use of a potentiometer. Here, it is problematic that, with time, because of bearing play of the accelerator pedal, deformations especially of plastic parts of the accelerator pedal and changes of the characteristic line of the sensor used for detecting the degree of actuation of the accelerator pedal can shift, because of temperature drift and wear, the switch point of the accelerator pedal for the activation of the kick-down function or the function of the escape switch to another degree of actuation of the accelerator pedal. Alternatively, for the detection of the kick-down function or the function of the escape switch, a mechanical switch can be used which is actuated when the accelerator pedal is floored down to the stop.

Accordingly, various operator-controlled functions are realized by the accelerator pedal, namely, on the one hand, the input of a driver command torque, and on the other hand, the realization of the kick-down function or the function of the escape switch. These various operator-controlled functions are realized in dependence upon the degree of actuation of the accelerator pedal. As long as the accelerator pedal is not pressed to the stop, the operator-controlled function of the input of the driver command torque is realized. If the accelerator pedal is pressed through to the stop, then the kick-down function or the function of the escape switch is realized as the operator-controlled function. The accelerator pedal is actuated against a spring force. At least two of the degrees of actuation of the accelerator pedal are characterized by different spring constants.

SUMMARY OF THE INVENTION

Compared to the above, the method of the invention and the arrangement of the invention afford the advantage that at least one of the operator-controlled functions of the operator-controlled element is detected in dependence upon the spring constant assigned to the instantaneous degree of actuation. In this way, a clear allocation of the signal of a sensor, which is used to detect the degree of actuation of the accelerator pedal, to the operator-controlled function, which is wanted by the driver, can be realized independently of the wear and the temperature drift of the sensor and independently of bearing play and the deformations, especially of plastic parts of the accelerator pedal, so that the operator-controlled function, which is wanted by the driver, is reliably detected and can be realized.

It is especially advantageous, if the degree of actuation is detected by a sensor, when: a measurement signal is generated by the sensor in dependence upon the detected degree of actuation; a time-dependent trace of the measurement signal is determined; and, in dependence upon a slope of the time-dependent course of the measurement signal, the at least one operator-controlled function is detected. In this way, the spring constant, which is assigned to the instantaneous degree of actuation, and therefore the operator-controlled function, which is wanted by the driver, can be easily and reliably detected independently of bearing play and deformations, especially of plastic parts of the accelerator pedal and independently of wear and temperature drift of the sensor.

A further advantage is provided when the at least one operator-controlled function is detected when the slope of the time-dependent course of the measurement signal lies in a pregiven region. In this way, the detection of the at least one operator-controlled function can be realized very easily, for example, via threshold value comparison.

It is furthermore advantageous when the pregiven region is so selected that the time-dependent change of the measurement signal associated therewith is not achieved via actuation but via an automatic reset of the operator-controlled element. In this way, it is ensured that the operator-controlled function, which is to be detected with the aid of the threshold value, cannot be confused with an operator-controlled function for which the variation of the degree of actuation should lead to different input values, for example, a driver command torque, but not to a change of the operator-controlled function.

This can be easily realized in that the automatic reset can be achieved via a virtually jump-shaped reduction of the spring force.

When the virtually jump-shaped reduction of the spring force is effected via the spring constant, which is assigned to the at least one operator-controlled function, then the assignment of the at least one operator-controlled function to this spring constant is clear so that a defective detection of the at least one operator-controlled function is avoided.

It is especially advantageous when an accelerator pedal of a motor vehicle is selected as an operator-controlled element and a kick-down function or an escape switch function is selected as at least one operator-controlled function to overcome an activated speed limiting. At least one degree of actuation of the accelerator pedal in the vicinity of a stop is assigned to the at least one operator-controlled function. In this way, a kick-down function or an escape switch function can be especially reliably detected so that the vehicle can rapidly react in the desired manner especially in a dangerous situation.

A further advantage results when the at least one operator-controlled function is only detected when it is detected several times within a pregiven time interval. In this way, it is likewise ensured that a faulty detection of the at least one operator-controlled function is avoided.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
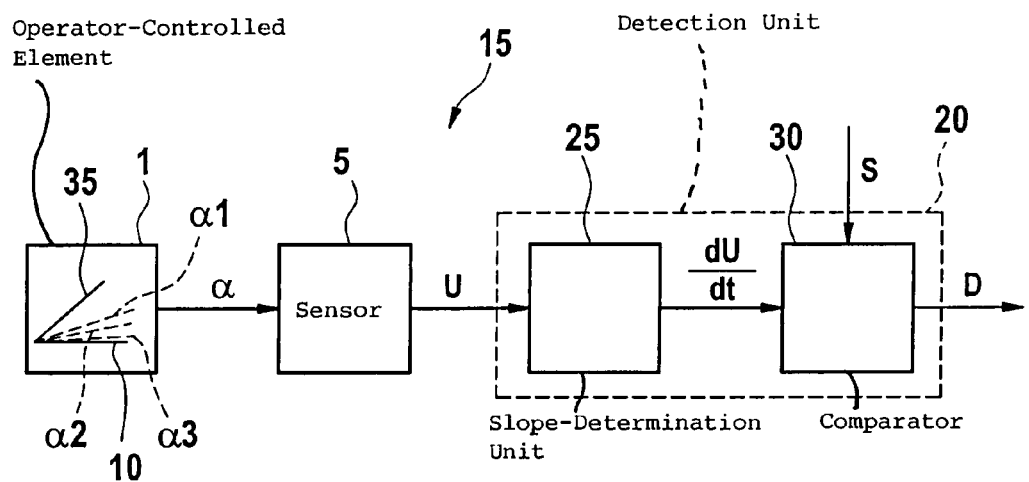
FIG. 1 is a function diagram for explaining the method of the invention and the arrangement of the invention; and, FIG. 2 is a diagram showing a sensor signal as a function of time for illustrating the method of the invention.

In FIG. 1, reference numeral 15 identifies an arrangement of the invention for detecting an operator-controlled function activated via an operator-controlled element 1. The operator-controlled element 1 can, for example, be an accelerator pedal of a motor vehicle. Such an accelerator pedal 1 is usually actuated against a spring force. Several different degrees $\alpha$ of actuation can be adjusted depending upon how strongly or with what force the driver actuates the accelerator pedal 1. In this example, various operator-controlled functions of the accelerator pedal 1 are realized in dependence upon the degree $\alpha$ of actuation. A first operator-controlled function comprises inputting a driver command torque in dependence upon the actuating degree $\alpha$ of the accelerator pedal 1. A second operator-controlled function comprises a kick-down function for the case that the vehicle has an automatic transmission or comprises an escape switch function for the case that the motor vehicle has a speed limiting function. The second operator-controlled function is activated when the accelerator pedal 1 is actuated completely or at least up to the immediate vicinity of the stop 10. The second operator-controlled function is assigned therefore to an actuating degree of the accelerator pedal 1 which lies in a pregiven region in the vicinity of the stop 10. The arrangement 15 also includes a sensor 5 which, for example, can be configured as a potentiometer, and the actuating degree $\alpha$ of the accelerator pedal 1 is detected in a manner known per se. The sensor 5 converts the actuating degree $\alpha$ into a voltage value U and conducts this voltage value U to a detection unit 20. The detection unit 20 can be implemented as software and/or hardware in a motor control of the motor vehicle. The detection unit 20 includes a slope determination unit 25 to which the voltage value U from the sensor 5 is outputted. The slope determination unit 25 determines the slope $dU(t)/dt$ of the time-dependent course of the received voltage values $U(t)$ from the voltage values $U(t)$ which are continuously received with the time t. The determined slope $dU(t)/dt$ is then supplied to a comparator unit 30 of the detection unit 20. In addition, a threshold value S from a memory (not shown in FIG. 1) is, for example, supplied to the comparator unit 30. The threshold value S can alternatively also be stored in the comparator unit 30. The comparator unit 30 compares the supplied slope $dU(t)/dt$ to the threshold value S. For the case that the slope $dU(t)/dt$ exceeds the threshold value S, the comparator unit 30 detects the second operator-controlled function, namely, the kick-down function or the escape switch function as the operator-controlled function wanted by the driver. Otherwise, the comparator unit 30 detects the first operator-controlled function, namely, the conversion of the actuating degree $\alpha$ into a driver command torque as the operator-controlled function wanted by the driver. The detected first or second operator-controlled function is outputted by the comparator unit 30 in the form of a detection signal D. The detection signal D, in the case of the first operator-controlled function can, for example, have a low signal level of, for example, 3.7 volts and, in the case of the second operator-controlled function, a higher signal level of, for example, 4.2 volts. The detection signal D, depending upon the signal level, causes the motor control to realize the second operator-controlled function, namely, the kick-down function or the escape switch function, or the first operator-controlled function.

Figure 2:
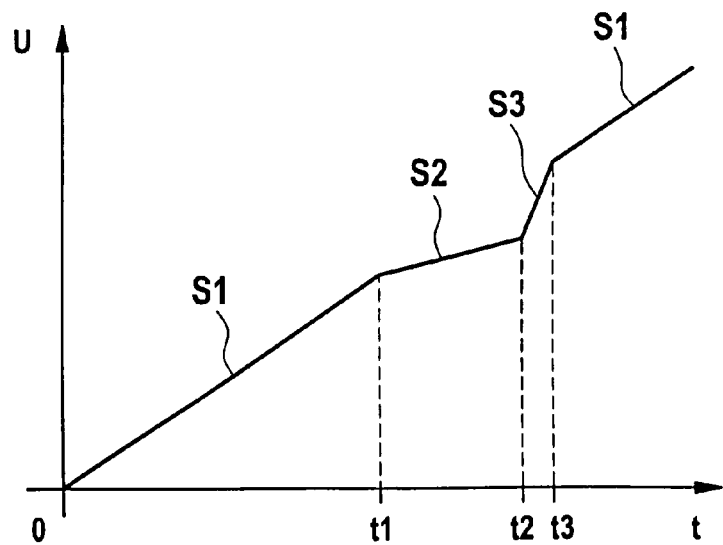

As described, the actuation of the accelerator pedal 1 takes place against a spring force. In FIG. 2, the time-dependent course of the voltage values U, which are outputted by the sensor 5, are shown. Here, it is assumed that the driver presses the accelerator pedal 1 through with a constant force from a zero position according to FIG. 1, whereat the accelerator pedal 1 is not actuated, up to the stop 10. The course of the voltage U is always proportional to the degree of actuation $\alpha$. For this reason, the voltage U increases up to a first time point t1 at which a first actuating degree $\alpha_1$ is reached, with a first slope S1. The spring force is to be overcome in accordance with a first spring constant up to the first actuating degree $\alpha_1$. When reaching the first actuating degree $\alpha_1$, the spring force, which acts against the actuation of the accelerator pedal 1, is increased to a second spring constant, for example, by switching in an additional spring or with the aid of a snap disc or with the aid of a spring-loaded bearing or in another manner known per se. This leads to the situation that, with a continuing constant force for the actuation of the accelerator pedal 1, the actuating degree $\alpha$ and also the voltage U, which is proportional to the actuating degree $\alpha$, increase over the time t at a second slope S2 which is less steep than the first slope S1. When reaching a second actuating degree $\alpha_2$ of the accelerator pedal 1, which is greater than the first actuating degree $\alpha_1$, at a second time point t2, which is after the first time point t1, the spring force, which acts against the actuation of the accelerator pedal 1, is guided virtually jump-like back to the first time constant. This relief of load is characterized by a third spring constant and takes place, for example, by a continuous removal of the additional spring or the snap disc or the spring-loaded bearing or in another manner known per se. The actuation degree $\alpha$ of the accelerator pedal 1 and, proportionally thereto, the voltage U increases in accordance with a third slope S3, which is steeper than the first slope S1, up to a third actuating degree $\alpha_3$ which is greater than the second actuating degree $\alpha_2$ and is reached at a third time point t3 which follows the second time point t2. Thereafter, the actuation degree $\alpha$ of the accelerator pedal 1 and the voltage U proportional thereto increase again in accordance with the slope S1 up to the stop 10. If the stop 10 is already reached at the third time point t3, then the slope $dU(t)/dt$ is equal to zero from the third time point t3 on. At the third time point t3, the accelerator pedal 1 is in the proximity, preferably in the direct proximity, of the stop 10.

The relief of load of the spring force after the second time point t2 is effected by the third spring constant. The third spring constant is so selected that the third actuating degree $\alpha_3$ is reached faster than it could ever possibly be reached by the maximum exercisable force of the driver for actuating the accelerator pedal 1. Furthermore, the third spring constant is independent of ambient influences such as temperature or wear or contamination. For this reason, the third spring constant (in contrast to the remaining spring constants) can be used for detecting an operator-controlled function of the accelerator pedal 1, in this example, the second operator-controlled function, whereby it is ensured that the second operator-controlled function is detected without fault. For this purpose, the pregiven threshold value S must be so selected that it is greater than the first threshold value S1 and the second threshold value S2 as well as each slope, which is achievable by the driver up to exercising the maximum possible force for actuating the accelerator pedal 1, and less than the third slope S3. The third slope S3 can be realized only via the virtually jump-like reduction of the spring force between the second time point t2 and the third time point t3. Generally, it can be said that the second operator-controlled function is detected when the slope $dU(t)/dt$ which is supplied to the comparator unit 30, lies in a pregiven range which is defined between a lower limit and an upper limit. The lower limit and the upper limit are stored in the comparator unit 30 or these limit values are supplied to the comparator unit 30 from a memory separate from the comparator unit 30. In the described embodiment, the region is already adequately defined by the threshold value S as lower limit. A slope dU(t)/dt, which lies outside of the pregiven region or below the threshold value S, leads to the detection of the first operator-controlled function.

Even if the actuation degree α, which is assigned to the two operator-controlled functions, should change because of environmental influences such as wear or temperature drift of the characteristic line of the sensor 5 or because of bearing play or because of deformations especially of the plastic parts of the accelerator pedal 1, the third spring constant and therefore the third slope S3 remain constant independently of the above-mentioned influences and independently of the actuation of the accelerator pedal 1. For this reason, a possibility is given by the method of the invention and the arrangement of the invention to detect and to distinguish the two operator-controlled functions reliably and without fault during the entire service life of the accelerator pedal 1. This is especially important for the second operator-controlled function because it must be capable of being activated without fault in dangerous situations. Because of the virtually jump-like reduction of the spring force between the second time point t2 and the third time point t3, the driver can also perceive this force jump and therefore has a feedback as to the activation of the second operator-controlled function.

Further measures for avoiding a malfunction of the second operator-controlled function can be achieved in that a check is repeatedly made between the second time point t2 and the third time point t3 as to whether the third slope S3 exceeds the pregiven threshold value. It can be provided that the second operator-controlled function is only detected when the third slope S3 exceeds the pregiven threshold value S with each of these tests.

It is understood that the foregoing description is that of the preferred embodiments of the invention and that various changes and modifications may be made thereto without departing from the spirit and scope of the invention as defined in the appended claims.

What is claimed is:

1. A method for detecting the actuation of a driver-controlled element for a vehicle actuable to assume different degrees of displacement and displaceable to a stop of said driver-controlled element, the method comprising the steps of:
realizing different driver-controlled functions of said driver-controlled element in dependence upon the degree of displacement or position of said driver-controlled element
wherein: a first one of said driver-controlled functions comprises inputting a driver command torque in dependence upon a degree of actuation of said driver controlled element; and, a second one of said driver-controlled functions comprises a kickdown function for an automatic transmission or an escape switch function for the case that the vehicle has a speed-limit function and said second driver-controlled function is activated when the driver-controlled element is actuated completely or up to the vicinity of said stop;
actuating said driver-controlled element against a spring force with two degrees of displacement being characterized by two 20 different spring constants, respectively;
determining a signal value (U) which characterizes the spring constant at the actual degree of actuation of said driver-controlled element;
detecting at least one of said driver-controlled functions of the driver-controlled element in dependence upon said determined signal value (U) which characterizes the spring constant;
utilizing a slope-determination unit to plot said signal value (U) as a function of time and to obtain a slope dU/dt of said signal value (U) thereof; and,
applying said slope dU/dt of said signal value (U) to a comparator and, if said slope dU/dt of said signal value (U) is greater than a threshold value, then said comparator detects said second driver-controlled function, otherwise, said comparator detects said first driver-controlled function.

2. The method of claim 1, wherein said method comprises the further step of detecting said one of said driver-controlled functions when said slope (du/dt) of said time-dependent course of said signal value (U) lies in a pregiven region.

3. The method of claim 2, wherein said pregiven region is defined by a threshold value.

4. The method of claim 2, comprising the further step of selecting said pregiven region so that the time-dependent course of said signal value (U) associated therewith occurs only via an automatic reset of said driver-controlled element.

5. The method of claim 4, wherein said automatic reset is achieved with an abrupt reduction of said spring force.

6. The method of claim 5, wherein said abrupt reduction of said spring force is effected by the spring constant assigned to the corresponding driver-controlled function.

7. The method of claim 1, comprising the further step of detecting one of said driver-controlled functions only when said one driver-controlled function is detected several times within a pregiven time interval.

8. The method of claim 1, wherein said driver-controlled element is a driver-controlled accelerator pedal.

9. An arrangement for detecting the actuation of a driver-controlled element for a vehicle actuable to assume different degrees of displacement and displaceable to a stop of said driver-controlled element, the arrangement comprising:
means for realizing different driver-controlled functions of said driver-controlled element in dependence upon the degree of displacement or position of said driver-controlled element wherein: a first one of said driver-controlled functions comprises inputting a driver command torque in dependence upon a degree of actuation of said driver-controlled element; and, a second one of said driver-controlled functions comprises a kickdown function for an automatic transmission or an escape switch function for the case that the vehicle has a speed-limit function and said second driver-controlled function is activated when the driver-controlled element is actuated completely or up to the vicinity of said stop;
said driver-controlled element being actuable against a spring force with two degrees of displacement being characterized by two different spring constants, respectively;
means for determining a signal value (U) which characterizes the spring constant at the actual degree of actuation of said driver-controlled element;
means for detecting at least one of said driver-controlled functions of the driver-controlled element in dependence upon said determined signal value (U) which characterizes the spring constant;
a slope-determination unit for plotting said signal value (U) as a function of time and to obtain the slope dU/dt of said signal value (U) thereof; and,
a comparator for receiving said slope dU/dt of said signal value (U) and, if said slope dU/dt of said signal value (U)

is greater than a threshold value, then said comparator detects said second driver-controlled function, otherwise, said comparator detects said first driver-controlled function.

10. The arrangement of claim 9, wherein said driver-controlled element is a driver-controlled accelerator pedal.

* * * * *

UNITED STATES PATENT AND TRADEMARK OFFICE
CERTIFICATE OF CORRECTION

PATENT NO. : 7,962,269 B2  Page 1 of 1
APPLICATION NO. : 10/786043
DATED : June 14, 2011
INVENTOR(S) : Thomas Klotzbuecher et al.

It is certified that error appears in the above-identified patent and that said Letters Patent is hereby corrected as shown below:

In column 5:
Line 64: please delete "20".

Signed and Sealed this
Thirteenth Day of September, 2011

David J. Kappos
*Director of the United States Patent and Trademark Office*